(12) United States Patent
Halleck

(10) Patent No.: US 6,321,418 B1
(45) Date of Patent: Nov. 27, 2001

(54) BELT CLIP WITH IMPROVED FLANGE

(75) Inventor: Michael E. Halleck, Longmont, CO (US)

(73) Assignee: iLife Ssytems, Inc., Dallas, TX (US)

( * ) Notice: Subject to any disclaimer, the term of this patent is extended or adjusted under 35 U.S.C. 154(b) by 0 days.

(21) Appl. No.: 09/461,652

(22) Filed: Dec. 14, 1999

(51) Int. Cl.⁷ .......................... A44B 11/00; A44B 21/00; A45F 5/02
(52) U.S. Cl. ................ 24/3.12; 24/3.3; 24/3.11; 224/269
(58) Field of Search ..................... 24/3.12, 3.11, 24/3.3, 597, 663; 224/269

(56) References Cited

U.S. PATENT DOCUMENTS

| | | | |
|---|---|---|---|
| 0,845,743 | * 3/1907 | Bindner | 24/3.12 |
| 2,528,878 | * 11/1950 | Graham | 24/3.12 |
| 4,754,528 | * 7/1988 | Lyons et al. | 24/3.12 |
| 5,044,049 | * 9/1991 | Owens et al. | 24/3.12 |
| 5,097,997 | * 3/1992 | Kipnis et al. | 24/3.12 |
| 5,184,375 | * 2/1993 | Hoyt | 24/3.12 |
| 5,408,728 | * 4/1995 | Wisniewski | 24/3.3 |
| 5,488,759 | * 2/1996 | Lim et al. | 24/3.12 |
| 5,829,102 | * 11/1998 | Conti | 24/3.11 |

* cited by examiner

Primary Examiner—Victor N. Sakran

(57) ABSTRACT

There is disclosed a belt clip capable of being clipped onto a user's belt or garment edge for carrying small items like a pager or a cellular telephone. The belt clip comprises a belt clip body with a bottom flange that has two different flange surfaces. The first flange surface is flat and abuts the back of the cellular telephone when the cellular telephone is attached to the belt clip. The second flange surface is also flat but lies in a plane that is disposed at an angle with respect to the plane of the first flange surface. The second flange surface does not abut the back of the cellular telephone. A space is formed between the second flange surface and the back of the cellular telephone to facilitate the placement of the combination of the belt clip and cellular telephone on the user's belt or garment edge. The space also facilitates the removal of the combination of the belt clip and cellular telephone from the user's belt or garment edge.

20 Claims, 6 Drawing Sheets

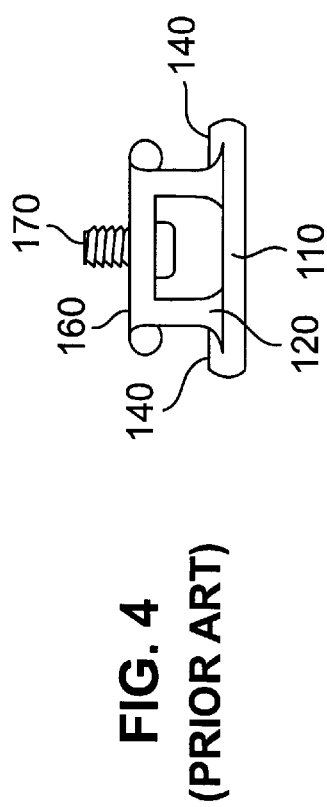
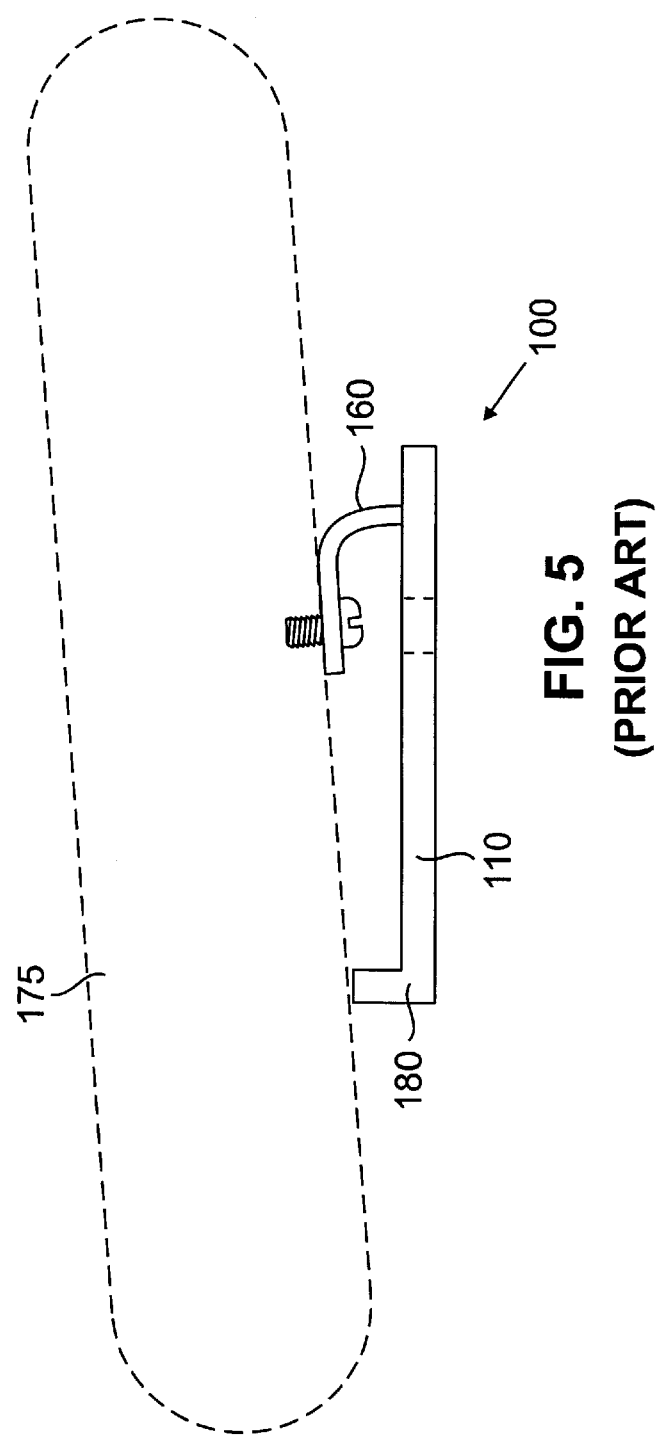
FIG. 4
(PRIOR ART)
FIG. 5
(PRIOR ART)

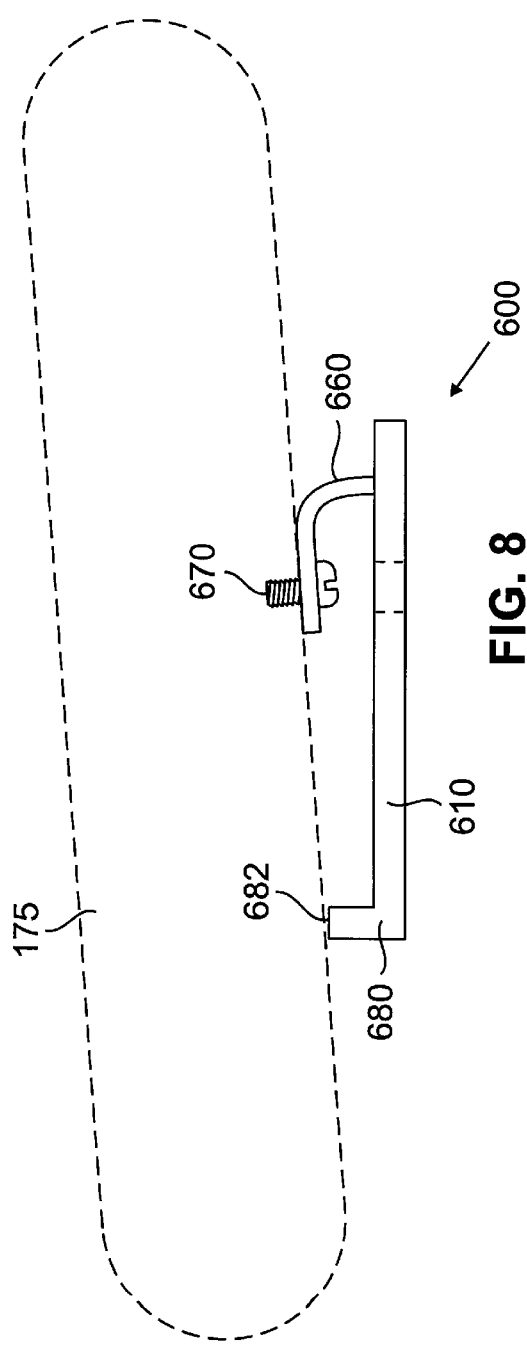
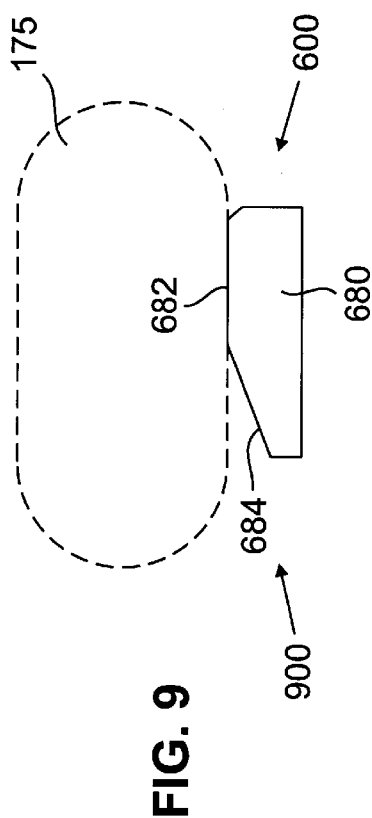

BELT CLIP WITH IMPROVED FLANGE

TECHNICAL FIELD OF THE INVENTION

The present invention is directed, in general, to technology for mounting and carrying items and, more specifically, to a belt clip for mounting and carrying on one's person a small item such as a pager or a cellular telephone.

BACKGROUND OF THE INVENTION

Reliable predictions indicate that there will be over three hundred million (300,0000,000) cellular telephone customers worldwide by the year 2000. Almost all cellular telephones are hand-held units that are completely portable. When a person carries a cellular telephone, he or she can either hold the telephone manually or keep the telephone in a garment pocket. Many cellular telephone users desire to avoid the inconvenience of continually carrying the telephone by hand and the awkwardness of storing the telephone in a pocket and retrieving the phone from the pocket.

To do this, many cellular telephone users attach to their cellular telephone a belt clip that may be attached to any garment edge, such as the edge of a pocket or, more commonly, the edge of a belt or waistband. The cellular telephone is detachably coupled to the clip, usually with a threaded machine screw that screws into a threaded receptacle in the back of the telephone. The belt clip with the telephone attached to it is then placed over and clipped onto the user's belt or waistband.

The telephone conveniently hangs on the user's belt until the user needs to use the telephone. When the telephone is needed, the user removes the belt clip (with the telephone attached) from the belt and uses the telephone. When the telephone is no longer needed, the user again places the belt clip (with the telephone attached) over the belt. The use of a belt clip for carrying a cellular telephone in such a manner has become widespread.

It is not easy to quickly place prior art belt clips into position over a user's belt. Many times a user finds it difficult to quickly maneuver a prior art belt clip into its proper position. This is due to the fact that the width of the leading edge of prior art belt clips is large compared to the space between the user's belt and the user's clothes through which the leading edge of the belt clip must pass in order to be placed into its proper position.

For example, in the case of a belt worn with trousers, the belt typically passes through belt loops sewn at intervals along the top edge of the trousers. The belt loops serve to secure the belt in place and (when the belt is buckled) assist in holding the belt sufficiently close to the surface of the trousers to keep the trousers in place. In this position the belt lies in close contact with the surface of the material of the trousers all around the top edge of the trousers.

A user attempting to place a belt clip between the belt and the trouser material that immediately faces the belt must force the belt away from the trouser material in order to make an opening large enough for the leading edge of the belt clip to pass through. The user usually attempts to do this by pushing the leading edge of the belt clip up to the juncture between the belt and the trouser material and moving the leading edge of the belt clip around to displace the belt from its position next to the trouser material. After the user succeeds in inserting the leading edge of the belt clip into the space between the belt and the trouser material, the user then pushes the belt clip down into place between the belt and the trouser material.

Placing the belt clip over the belt in this manner may require several attempts because the width of the leading edge of the belt clip is large in relation to the space that normally exists between the belt and the trouser material. In addition, the leading edge of the belt clip that must be inserted between the belt and the trouser material is under a spring loaded pressure to force the leading edge of the belt clip firmly against the back of the cellular telephone. Also, users frequently attempt to accomplish the placement of the belt clip with one hand while that hand is holding the cellular telephone and belt clip combination. Under such circumstances a user generally can not consistently place the belt clip into position quickly and easily.

It is also not uncommon for users to encounter similar difficulties when removing the belt clip from its position on the user's belt.

SUMMARY OF THE INVENTION

To address the deficiencies of such prior art belt clips, it is a primary object of the present invention to provide an improved belt clip for carrying a small item such as a pager or a cellular telephone or a similar type of portable item.

It is another object of the present invention to provide a belt clip that may be quickly and easily placed into position on the user's belt, waistband, pocket, lapel, cuff or other garment edge.

It is a further object of the present invention to provide a belt clip that may be quickly and easily removed from its position on the user's belt, waistband, pocket, lapel, cuff or other garment edge.

It is an additional object of the present invention to provide a belt clip that may be quickly and easily placed into position on any item having an edge having the appropriate dimensions to receive the belt clip.

The apparatus of the present invention will be described as an improved belt clip attached to a cellular telephone. It is important to realize that the apparatus of the present invention is not limited to use only with a cellular telephone. Those skilled in the art will readily understand that the principles of the present invention may also be successfully applied to carry other types of lightweight portable items such as pagers, keys on keychains, badges, small tools, tape measures, calculators, hand held computers, computer devices, medical monitors, data recording machines, computerized clipboard devices, and the like. However, in the descriptions that follow, a cellular telephone is employed for illustration purposes.

An advantageous embodiment of the present invention comprises a belt clip having a belt clip body that is capable of being attached to the back of a cellular telephone. The belt clip body is formed having portions that define a bottom flange. The bottom flange is urged into contact with the back of the cellular telephone by pressure from the spring action of a curved clip plate. When the belt clip and cellular telephone combination is clipped onto a user's belt, the pressure of the flange against the back of the cellular telephone assists in keeping the belt clip and cellular telephone combination on the user's belt.

An advantageous embodiment of the present invention comprises an improved flange that is formed having portions that define two different flange surfaces. The first flange surface is flat and abuts the back of the cellular telephone. The second flange surface is also flat but lies in a plane that is disposed at an angle with respect to the plane of the first flange surface. The second flange surface does not abut the back of the cellular telephone.

A space or "notch" is formed between the second flange surface and the back of the cellular telephone. The presence of the space or "notch" between the second flange surface and the cellular telephone facilitates the placement of the belt clip of the present invention onto the user's belt. The space or "notch" also facilitates the removal of the belt clip of the present invention from the user's belt.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4 illustrates an end view of said prior art belt clip; and

FIG. 5 illustrates a side view of said prior art belt clip attached to a device such as a cellular telephone; FIG. 8 illustrates a side view of the belt clip of the present invention attached to a device such as a cellular telephone (shown in dotted outline); and FIG. 9 illustrates an end view of the belt clip of the present invention attached to a device such as a cellular telephone (shown in dotted outline)

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the present invention may be implemented in a suitably modified belt clip.

The belt clip of the present invention can be used in numerous applications. It is anticipated that the belt clip will often be used with small portable items such as pagers or cellular telephones. However, the belt clip may be used with numerous other types of small portable items, including, without limitation, keys on keychains, badges, small tools, tape measures, calculators, hand held computers, computer devices, medical monitors, data recording machines, computerized clipboard devices, and the like.

The belt clip of the present invention will be described as a belt clip for attachment to a user's belt. It is understood, however, that the belt clip may be attached to any type of garment edge, such as the edge of a pocket, or the edge of a belt, or the edge of a waistband, or the edge of a lapel, or the edge of a cuff, or the like. It is also understood that the belt clip may be attached to any item having an edge having the appropriate dimensions to receive the belt clip.

Figure 1:
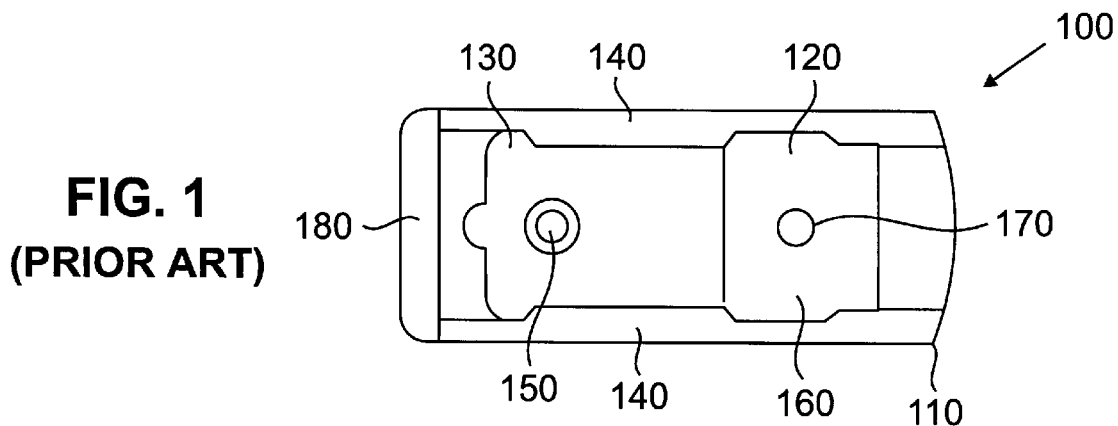
FIG. 1 illustrates a plan view of the bottom of a prior art belt clip.

FIGS. 1–4 depict a prior art belt clip 100. FIG. 1 illustrates a plan view of the bottom of belt clip 100. Belt clip 100 comprises belt clip body 110, which has portions that are adapted to receive and lock a clip structure 120 within belt clip body 110. Clip structure 120 is formed having portions that form a locking flange 130 that may be slidably disposed within belt clip body 110. Belt clip body 110 also has portions that form two retaining rails 140, with each retaining rail 140 disposed on an opposite side of belt clip body 110.

As shown in FIG. 1 and FIG. 4, retaining rails 140 hold clip structure 120 against belt clip body 110 after clip structure 120 has been slidably inserted within belt clip body 110.

Belt clip body 110 is also formed having portions that define locking peg 150 for engaging locking flange 130 of clip structure 120. In this particular embodiment, locking peg 150 is circular in shape. Locking flange 130 of clip structure 120 has portions that define a hole for receiving locking peg 150 when locking flange 130 has been fully inserted into belt clip body 110. After locking peg 150 has fitted itself into the hole in locking flange 130, clip structure 120 is securely attached to belt clip body 110.

The other end of clip structure 120 is formed having portions that define curved clip plate 160. Clip plate 160 is formed having portions that define a hole within clip plate 160 for receiving a machine screw 170 or other similar attachment device. Cellular telephone 175 (shown in FIG. 5 in dotted outline), which has a threaded receptacle (not shown) in one of its surfaces, may be attached to clip plate 160 by machine screw 170.

Figure 2:
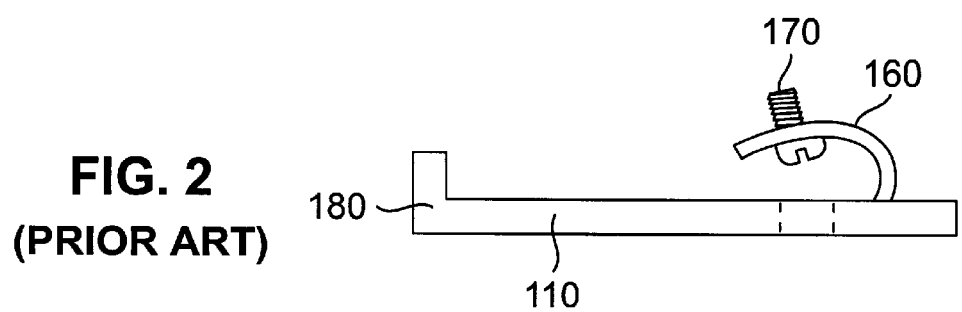
FIG. 2 illustrates a side view of said prior art belt clip.
Figure 3:
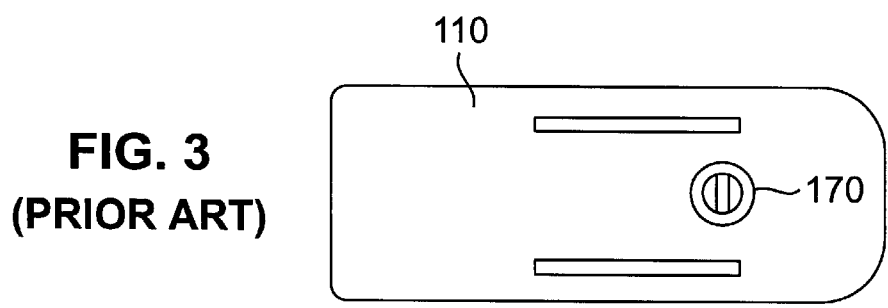
FIG. 3 illustrates a plan view of the top of said prior art belt slip.

FIG. 2 illustrates a side view of belt clip 100. FIG. 3 illustrates a plan view of the top of belt clip 100. As shown in FIG. 2 in dotted outline and as shown in FIG. 3, belt clip body 110 is formed having portions that define a hole through said belt clip body 110 adjacent to the location of machine screw 170. The purpose of this hole in belt clip body 110 is to allow the user easy screwdriver access to machine screw 170 in order to tighten or loosen machine screw 170 as may be necessary.

FIG. 5 shows a side view of how belt clip 100 is attached to the back of a cellular telephone 175 (shown in dotted outline). Clip plate 160 is the point of attachment. As shown in FIG. 1, FIG. 2, and FIG. 5, one end of belt clip body 110 forms flange 180 at the lower edge of belt clip 100. When the lower edge of belt clip 100 (with the attached cellular telephone 175) is inserted into the space between the user's belt and the user's clothes, flange 180 is the leading edge of belt clip 100. When the cellular telephone 175 is attached to belt clip 100 one portion of the back of the cellular telephone 175 rests on flange 180 as shown in FIG. 5.

Flange 180 is held against the back of the cellular telephone 175 by the spring action of curved clip plate 160. It is the force of the spring action of curved clip plate 160 transmitted to flange 180 that enables flange 180 to provide pressure against the back of the cellular telephone 175. This pressure keeps the cellular telephone 175 in place after the belt clip 100 and cellular telephone 175 combination has been positioned over and clipped onto the user's belt (or other garment or item). Any external force on the cellular telephone 175 would have to be great enough to overcome the pressure exerted by flange 180 in order to knock the cellular telephone 175 off the user's belt (or other garment or item).

When a user attempts to position belt clip 100 (with the attached cellular telephone 175) onto the user's belt, the user must cause the belt to pass through the juncture between flange 180 and the back of cellular telephone 175 immediately opposite flange 180. Because of the pressure of flange 180 against the back of cellular telephone 175, the user must overcome this pressure and force the belt through the juncture between flange 180 and the back of cellular telephone 175. Forcing the belt in this manner temporarily moves flange 180 away from the back of cellular telephone 175. After the belt is in position between belt clip body 110 and the back of cellular telephone 175, flange 180 moves back into position against the back of cellular telephone 175 under pressure from the spring action of curved clip plate 160.

To temporarily reduce the pressure of flange 180 when the user is placing belt clip 100 on a belt, the user may pinch the end of belt clip body 110 away from flange 180 (i.e., the end where clip plate 160 is attached). The pinching moves the end of belt clip body 110 where clip plate 160 is attached toward the back of is cellular telephone 175. While the pinching is taking place, the pressure exerted by flange 180 is reduced. The pressure of flange 180 against the back of cellular telephone 175 may even drop to zero if the force of the pinching is great enough. Although this pinching facilitates the passage of the belt between flange 180 and the back of cellular telephone 175, it is awkward for the user to accomplish this pinching while the user is holding cellular telephone 175 in the same hand and simultaneously attempting to move belt clip 100 into its proper position.

The present invention does not require the user to pinch the belt clip 100 as described above. In addition, the improved belt clip of the present invention does not require the user to spend time fumbling with the belt clip to get it into its proper position. The improved belt clip of the present invention facilitates the process of inserting the belt clip into its proper position by providing an improved flange to facilitate the quick and easy placement and removal of the belt clip.

The improved belt clip 600 of the present invention is shown in FIGS. 6–10. The improved belt clip 600 comprises clip plate 660 and machine screw 670, similar to the prior art clip plate 160 and machine screw 170 shown in FIGS. 1–5. The improved belt clip 600 also comprises an improved belt clip body 610, shown in it FIGS. 6 and 7. Belt clip body 610 of the present invention is formed having portions that define retaining rails 640, similar to the prior art retaining rails 140. Belt clip body 610 also has a locking peg 650, similar to the prior art locking peg 150.

Figure 6:
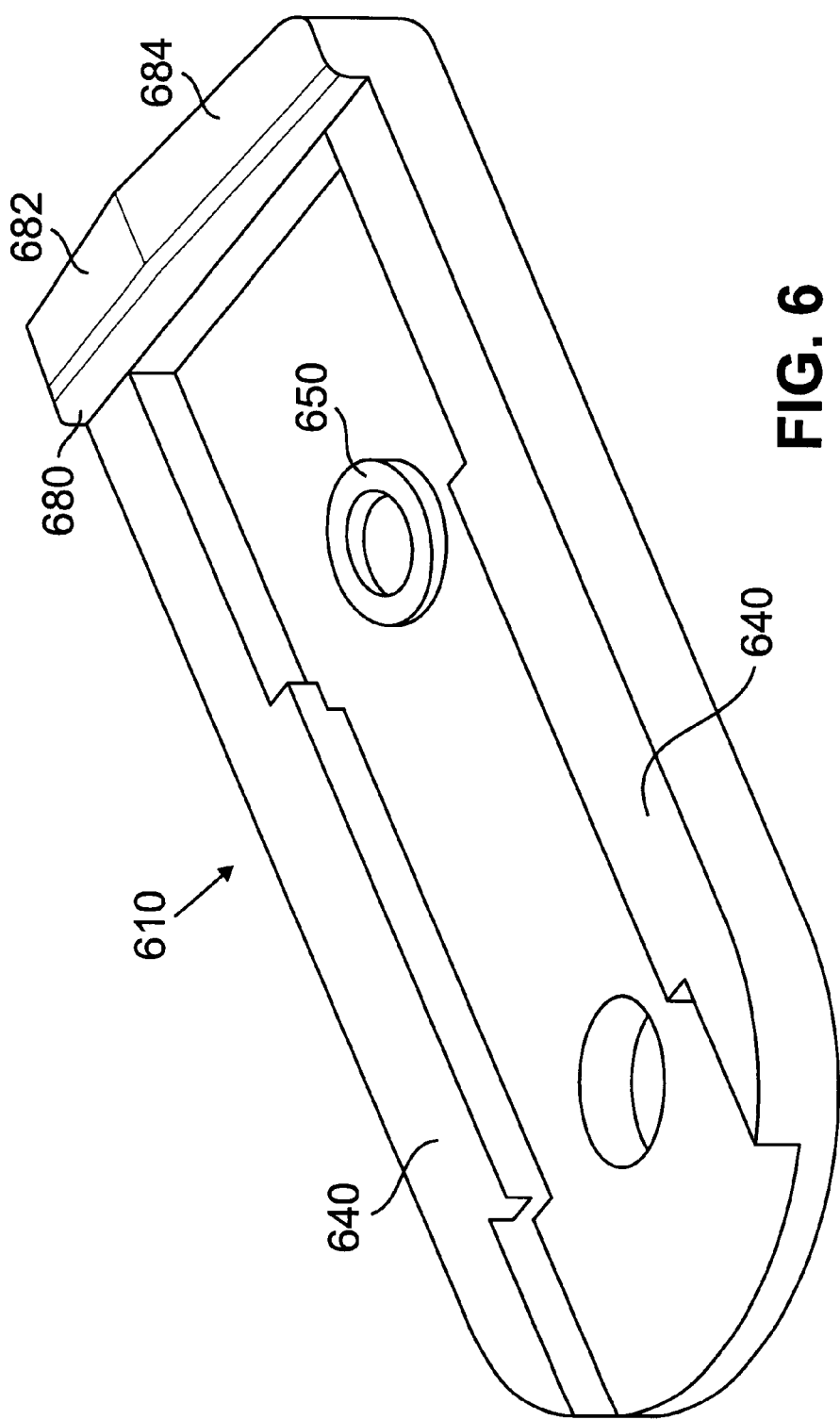
FIG. 6 illustrates a perspective view of the bottom of the body of a belt clip of the present invention.

Belt clip body 610 of the present invention is formed having portions that define an improved flange 680 at the lower edge of belt clip 610. As shown in FIG. 6, flange 680 is formed having portions that define two different surfaces, 682 and 684, along the edge of flange 680 that form the juncture between belt clip 600 and cellular telephone 175. First flange surface 682 is flat and lies in a plane that is approximately parallel to the plane of belt clip body 610 and the surface of cellular telephone 175. First flange surface 682 abuts the back of cellular telephone 175 in the same manner as flange 180 of the prior art belt clip 100.

Figure 7:
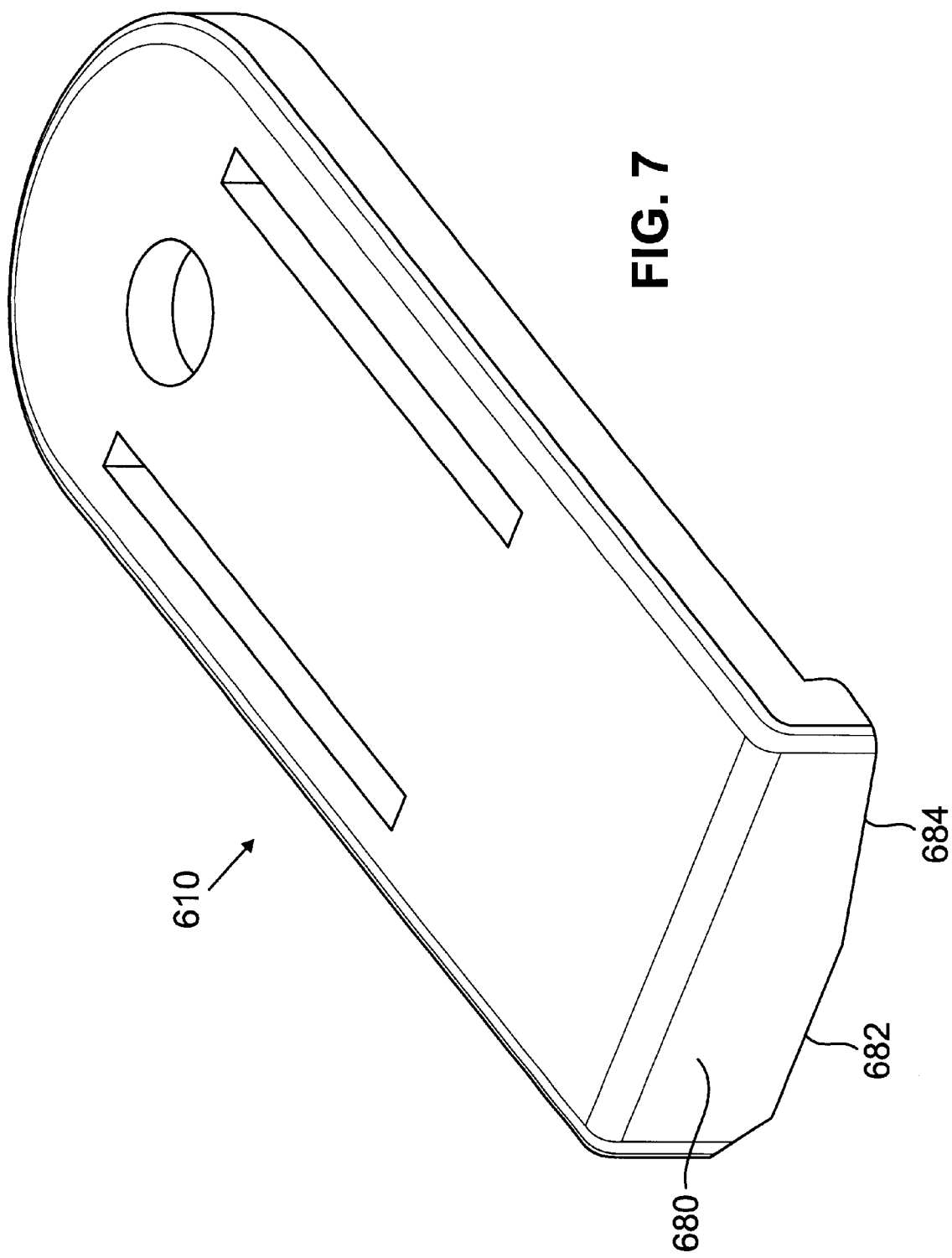
FIG. 7 illustrates a perspective view of the top side of the body of a belt clip of the present invention.

Second flange surface 684 of belt clip body 610 is also flat but lies in a plane that is disposed at an angle with respect to the plane of first flange surface 682 and the surface of cellular telephone 175. Second flange surface 684 does not abut the back of cellular telephone 175. FIG. 7 illustrates a view of the top of belt clip body 610. FIG. 7 shows the relative size of the angle between the planes of first flange surface 682 and second flange surface 684.

As shown in FIG. 8, when cellular telephone 175 is attached to belt clip 600 of the present invention, one portion of the back of cellular telephone 175 rests on first flange surface 682 of flange 680. Like prior art flange 180, flange 680 of the present invention is held against the back of cellular telephone 175 by the spring action of curved clip plate 660. It is the force of the spring action of curved clip plate 660 transmitted to first flange surface 682 of flange 680 that enables flange 680 to provide pressure against the back of cellular telephone 175. In this respect improved flange 680 operates in the same manner as prior art flange 180.

Unlike prior art flange 180, second flange surface 684 of flange 680 shown in FIG. 9 does not abut the back of the cellular telephone 175. A space 900 (or "notch" 900) is formed between second flange surface 684 of flange 680 and the back of cellular telephone 175.

The presence of space 900 between flange 680 and cellular telephone 175 facilitates the placement and removal of belt clip 600 of the present invention. When a user desires to place the belt clip 600 and cellular telephone 175 combination on the user's belt or other garment edge, the user aligns the space 900 over the belt or garment edge. The width of space 900 makes it possible to quickly and easily align the edge of the belt or garment in its proper position between flange 680 and cellular telephone 175. The user does not need to fumble around trying to engage the edge of the belt or garment into space 900. The edge of the belt or garment slides easily into space 900.

Once the edge of the belt or garment has been engaged into space 900, the user simply pushes the belt clip 600 and cellular telephone 175 combination down into carrying position on the belt or garment. The angle of second surface 684 of flange 680 carries the edge of the belt or garment quickly and directly to the junction between first flange surface 682 and cellular telephone 175. The user does not need to pinch any portion of belt clip 600 to reduce the pressure exerted by flange 680 to enable the belt or garment to be engaged.

The presence of space 900 also facilitates the removal of the belt clip 600 and cellular telephone 175 combination from the user's belt or garment. When the user desires to remove the belt clip 600 and cellular telephone 175 combination from the user's belt or garment, the user moves the edge of belt clip body 610 that defines space 900 toward the edge of the user's belt or garment that is located between belt clip body 610 and cellular telephone 175. The edge of the belt or garment quickly and easily moves into position within space 900. The user then simply pulls up on the belt clip 600 and cellular telephone 175 combination to unclip it from the belt or garment.

There is no need for the user to fumble around trying to engage the edge of the belt or garment into space 900 in order to remove the belt clip 600 from the belt or garment. The edge of the belt or garment slides easily into space 900. The user does not need to pinch any part of belt clip 600 to reduce the pressure exerted by flange 680 to enable the belt clip 600 to be disengaged from the belt or garment.

Figure 10:
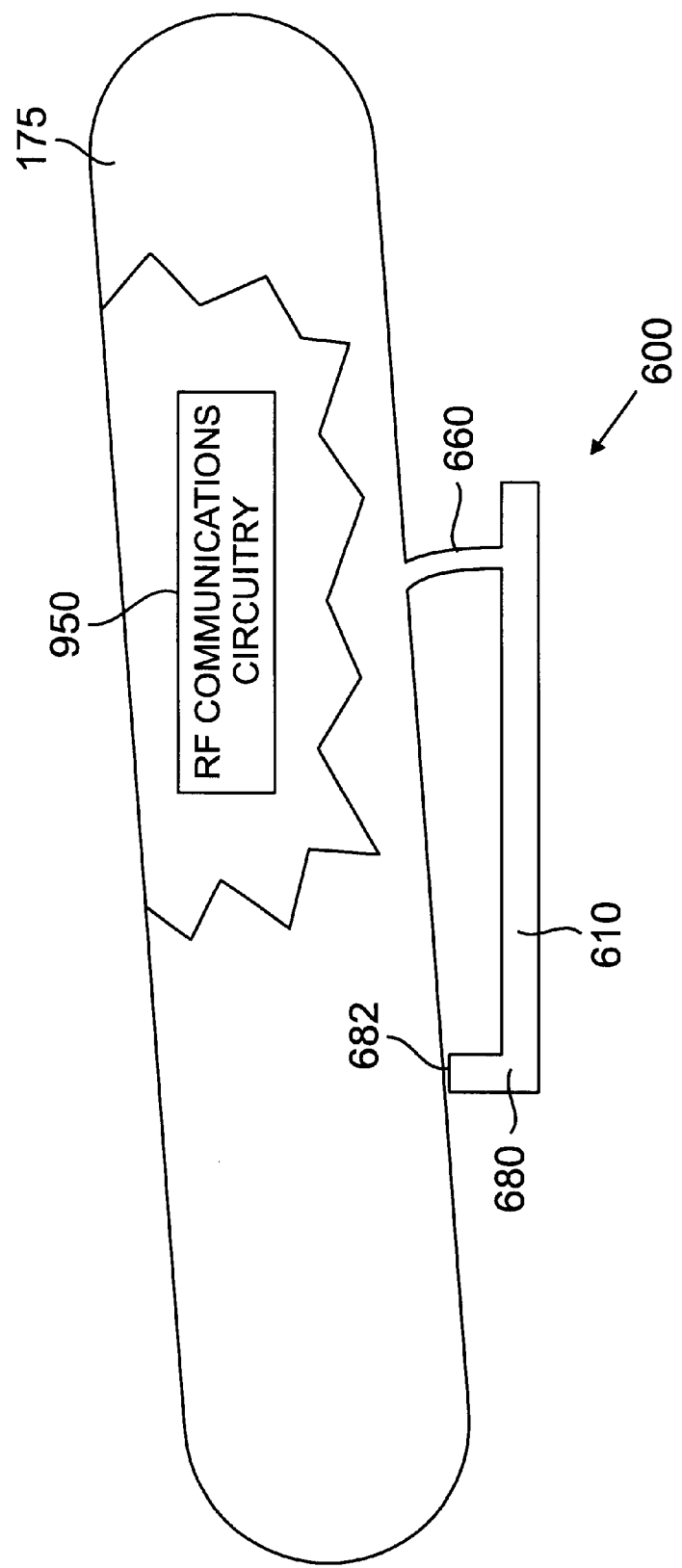
FIG. 10 illustrates a side view of the belt clip of an alternative embodiment of the present invention formed as an integral part of a device such as a cellular telephone.

FIG. 10 shows an alternative embodiment of the invention in which the belt clip 600 is formed as an integral part of an item such as a wireless messaging device (shown as a cellular telephone 175) that is capable of containing radio frequency communications circuitry 950. Although a cellular telephone 175 is shown for purposes of illustration, it is clear that any type of item may be used to practice this alternative embodiment of the invention. In the alternative embodiment of the invention cellular telephone 175 comprises a chassis that is formed having portions that form belt clip 600 including clip plate 660. This arrangement is shown in FIG. 10. As in the case previously described, flange 680 rests against the back of the chassis of cellular telephone 175 and space 900 facilitates the placement and removal of cellular telephone 175 with respect to the user's belt or garment.

A primary advantageous embodiment of the present invention has been described for a belt clip that is attachable to a garment edge. In an alternative advantageous embodiment of the present invention belt clip 600 is capable of being attached to any item (not shown) that has an edge having the appropriate dimensions to receive belt clip 600.

Specifically, belt clip 600 may be attached to a first item (not shown) as previously described. Belt clip 600 comprises belt clip body 610 with first flange surface 682 for abutting the first item when belt clip 600 is attached to the first item, and second flange surface 684 disposed at an angle to first flange surface 682. Second flange surface 684 is capable of guiding an edge of a second item (not shown) into the juncture between first flange surface 682 and the first item when belt clip 600 is attached to the first item.

Although the present invention has been described in detail, those skilled in the art should understand that they can make various changes, substitutions and alterations herein without departing from the spirit and scope of the invention in its broadest form.

Specifically, it is understood that the two flange surfaces of the present invention could be replaced by three or more flange surfaces. The presence of additional flange surfaces in flange 680 would alter the shape of the space 900 between flange 680 and cellular telephone 175. An advantageous embodiment of the invention comprises the two flange surfaces, 682 and 684, as described above. It is possible, however, to design additional embodiments of the present invention utilizing three or more flange surfaces.

What is claimed is:

1. A belt clip capable of being attached to an item, said belt clip having a belt clip body with a flange that has at least two flange surfaces wherein said flange comprises a first flange surface for abutting said item when said item is attached to said belt clip, and a second flange surface disposed at an angle to said first flange surface.

2. A belt clip as claimed in claim 1 wherein said second flange surface forms a space between said second flange surface and said item, when said item is attached to said belt clip.

3. A belt clip as claimed in claim 1 wherein said second flange surface is capable of guiding a garment edge into the juncture between said first flange surface and said item, when said item is attached to said belt clip.

4. A belt clip as claimed in claim 1 wherein said item is selected from the group of cellular telephones, pagers, badges, keys, small tools, tape measures, calculators, hand held computers, computer devices, medical monitoring devices, data recording machines and computerized clipboard devices.

5. A belt clip as claimed in claim 1 with a clip plate capable of transmitting pressure to one of at least two flange surfaces to cause said one of at least two flange surfaces to abut said item, when said item is attached to said belt clip.

6. A belt clip as claimed in claim 1 with a clip plate capable of transmitting pressure to said first flange surface to cause said first flange surface to abut said item when said item is attached to said belt clip.

7. A belt clip as claimed in claim 6 wherein said item is selected from the group of cellular telephones, pagers, badges, keys, small tools, tape measures, calculators, hand held computers, computer devices, medical monitoring devices, data recording machines and computerized clipboard devices.

8. A belt clip capable of being attached to an item to be carried on a user's garment edge, said belt clip having a belt clip body with a flange in which the end of said flange that first slides over the user's garment edge is narrower than the remaining portions of said flange of said belt clip body wherein said end of said flange that first slides over the user's garment edge comprises a second flange surface disposed at an angle to a first flange surface, where said first flange surface abuts said item when said item is attached to said belt clip.

9. A belt clip capable of being attached to a first item, said belt clip having a belt clip body with a first flange surface for abutting said first item when said belt clip is attached to said first item, and a second flange surface disposed at an angle to said first flange surface, wherein said second flange surface is capable of guiding an edge of a second item into the juncture between said first flange surface and said first item, when said belt clip is attached to said first item.

10. A belt clip capable of being attached to a cellular telephone, said belt clip having a belt clip body with a flange that has at least two flange surfaces wherein said flange comprises a first flange surface for abutting said cellular telephone when said cellular telephone is attached to said belt clip, and a second flange surface disposed at an angle to said first flange surface.

11. A belt clip as claimed in claim 10 wherein said second flange surface forms a space between said second flange surface and said cellular telephone, when said cellular telephone is attached to said belt clip.

12. A belt clip as claimed in claim 10 wherein said second flange surface is capable of guiding a garment edge into the juncture between said first flange surface and said cellular telephone, when said cellular telephone is attached to said belt clip.

13. A belt clip as claimed in claim 10 with a clip plate capable of transmitting pressure to said first flange surface to cause said first flange surface to abut said cellular telephone when said cellular telephone is attached to said belt clip.

14. A belt clip capable of being attached to a cellular telephone to be carried on a user's garment edge, said belt clip having a belt clip body with a flange in which the end of said flange that first slides over the user's garment edge is narrower than the remaining portions of said flange of said belt clip body wherein said end of said flange that first slides over the user's garment edge comprises a second flange surface disposed at an angle to a first flange surface, where said first flange surface abuts said cellular telephone when said cellular telephone is attached to said belt clip.

15. A wireless messaging device comprising a chassis capable of containing radio frequency communications circuitry, wherein said chassis has portions that form a belt clip with a flange that has at least two flange surfaces wherein said flange comprises a first flange surface for abutting said wireless messaging device and a second flange surface disposed at an angle to said first flange surface.

16. A wireless messaging device as claimed in claim 15 wherein said second flange surface forms a space between said second flange surface and said wireless messaging device.

17. A wireless messaging device as claimed in claim 15 wherein said second flange surface is capable of guiding a garment edge into the juncture between said first flange surface and said wireless messaging device.

18. A wireless messaging device as claimed in claim 15 wherein said wireless messaging device is selected from the group of cellular telephones, pagers, hand held computers, computer devices, and medical monitoring devices.

19. A wireless messaging device as claimed in claim 15 with portions that form a clip plate capable of transmitting pressure to said first flange surface to cause said first flange surface to abut said wireless messaging device.

20. A wireless messaging device comprising a chassis capable of containing radio frequency communications circuitry, wherein said chassis has portions that form a belt clip capable of being placed on a user's garment edge, said belt clip having a belt clip body with a flange in which the end of said flange that first slides over the user's garment edge is narrower than the remaining portions of said flange of said belt clip body wherein said end of said flange that first slides over the user's garment edge comprises a second flange surface disposed at an angle to a first flange surface, where said first flange surface abuts said wireless messaging device.

\* \* \* \* \*